US00RE44516E

(19) United States
(12) Reissued Patent
Markle

(10) Patent Number: US RE44,516 E
(45) Date of Reissued Patent: Oct. 8, 2013

(54) PERCH-SHANK DEVICE

(76) Inventor: Dennis Markle, Guthrie, OK (US)

(21) Appl. No.: 10/919,216

(22) Filed: Aug. 16, 2004

Related U.S. Patent Documents

Reissue of:
(64) Patent No.: 6,516,593
Issued: Feb. 11, 2003
Appl. No.: 09/905,539
Filed: Jul. 13, 2001

(51) Int. Cl.
*B68B 1/06* (2006.01)

(52) U.S. Cl.
USPC ..... 54/8

(58) Field of Classification Search
USPC ..... 54/6.1, 7–9
See application file for complete search history.

(56) References Cited

U.S. PATENT DOCUMENTS 124,187 A * 2/1872 Wolfington ..... 54/7
492,666 A * 2/1893 Driscoll ..... 54/8
637,170 A * 11/1899 Smith ..... 54/9
2,017,021 A * 10/1935 Tepper ..... 54/7
2,041,620 A 5/1936 Stephens
2,421,173 A * 5/1947 Ulrich ..... 54/6.1
D151,625 S 1/1948 Kelly
2,512,244 A * 6/1950 De Wolfe ..... 54/6.1
3,318,069 A 5/1967 Cunard
D252,163 S * 6/1979 Johnson ..... D30/21
4,274,246 A * 6/1981 Stewart ..... 54/6.1

OTHER PUBLICATIONS

Dutton Bits, Handmade Bits & Spurz "The Bit Maker", Greg and Delores Dutton, Los Lunas, New Mexico undated catalog.

* cited by examiner

*Primary Examiner* — Son T Nguyen
(74) *Attorney, Agent, or Firm* — R. William Graham

(57) ABSTRACT

A perch-shank device is disclosed as having a perch with an upper, central, and lower portion. The upper portion has an eyelet for attaching a headstall or chinstrap. The lower portion directly connects to a mouthpiece. The invention also includes a shank having an upper and lower portion, wherein the lower portion has an eyelet for attaching a rein and the upper portion of the shank is connected above the lower portion of the perch adjacent to one of the central and upper portion of the perch.

10 Claims, 4 Drawing Sheets

PERCH-SHANK DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention disclosed herein relates horse bits. More particularly, the present invention is directed to an improved design of the perch-shank piece of a horse bit. Thus, the present invention can be used to better bring the head of a horse toward the horse's chest.

2. Related Art

Numerous horse bits exist. However, unlike traditional bits (e.g., hackamore bits), the present invention works without applying pressure to the nose of a horse. While previous bits were comprised of multiple pieces, often rotatable (e.g., U.S. Pat. No. 3,318,069), the present invention is made of one piece, making it highly durable and reliable. The one piece construction, in addition to the present invention's design, provides for increased control of the horse.

Unlike perch-shank devices *10'* traditionally used, the present invention is designed so that the pressure on the horse's mouthpiece draws the horse's head more up and backward an downward, giving the rider more control and the horse proper form. This is achieved by increasing the distance between the mouthpiece and the attachment of the shank to the perch by moving the shank attachment above the lower portion of the perch to which the mouthpiece directly connects. Traditional perch-shank devices *10'*, because of the close relation between the mouthpiece *13' attachment portion 6' having central axis A'* and the attachment *16'* of the shank *4'* to the perch *12'* (*below upper part 11'*), exert a large amount of downward pressure on the horse's mouth pulling the horse's head more downward than backward. Therefore, traditional perch-shank devices *10'* force the rider to exert more pressure on the horse's mouth, while achieving less control over the horse than that provided by the present intention. Also, the less force placed on the horse's jaw is better for the horse. The equine industry even monitors and regulates the size by which such horse equipment may be made to avoid breaking the horse's jaw.

SUMMARY OF THE INVENTION

This invention relates to a perch-shank device comprising a perch having an upper, central, and lower portion. The upper portion has a means for attaching a headstall and chinstrap. The lower portion is configurable for attaching a mouthpiece. The invention also includes a shank having an upper and lower portion. The lower portion has a means for attaching a rein. The upper portion of the shank is connected adjacent one of the central an upper portion of the perch. Two perch-shank devices may be connected by a mouthpiece, wherein the mouthpiece connects the lower portions of each perch, extending therebetween.

DETAILED DESCRIPTION

Figure 2:
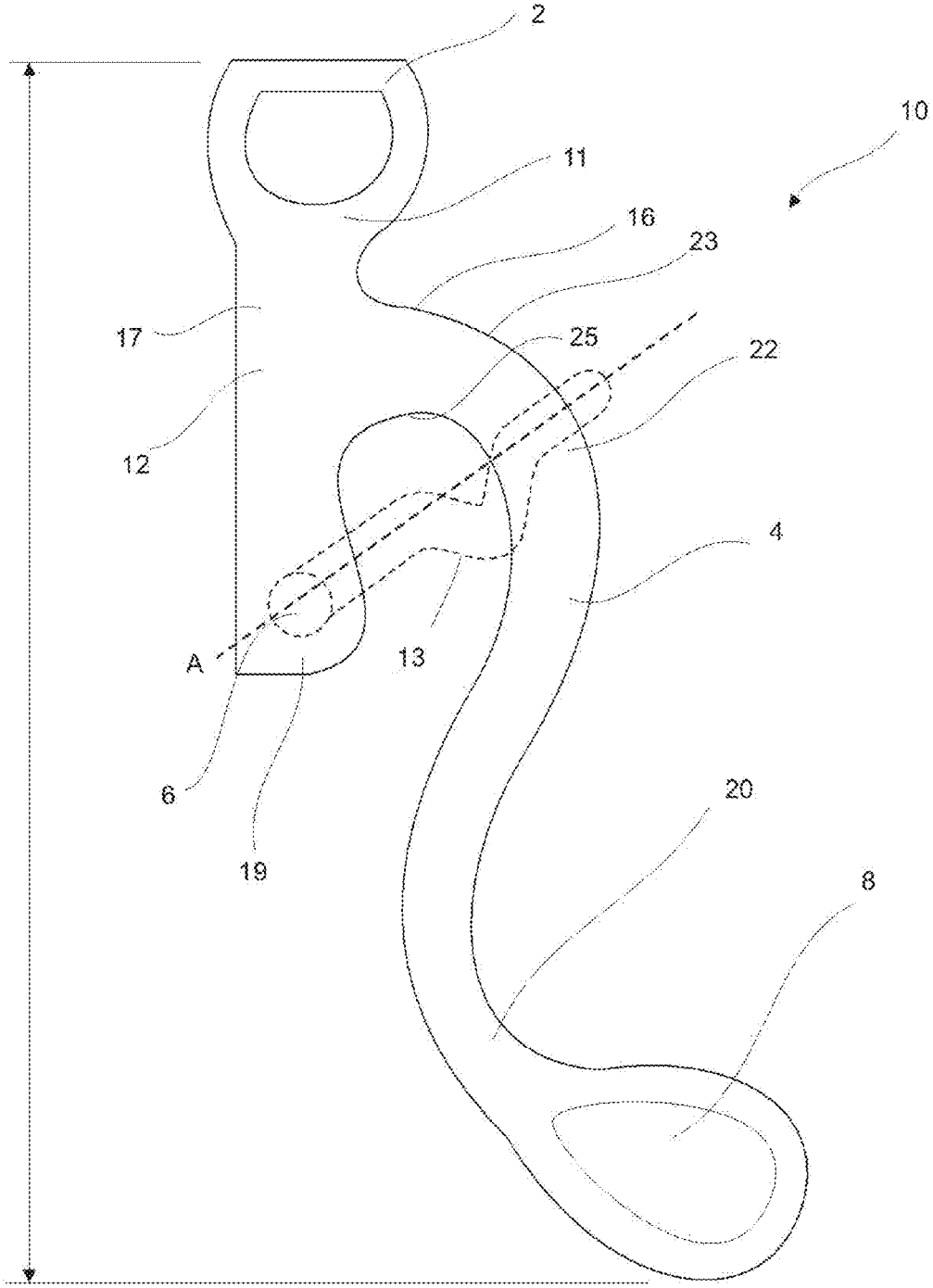
FIG. 2 is a side view of the perch-shank device of the present invention *showing in perspective a mouth piece in dotted lines.*
Figure 3:
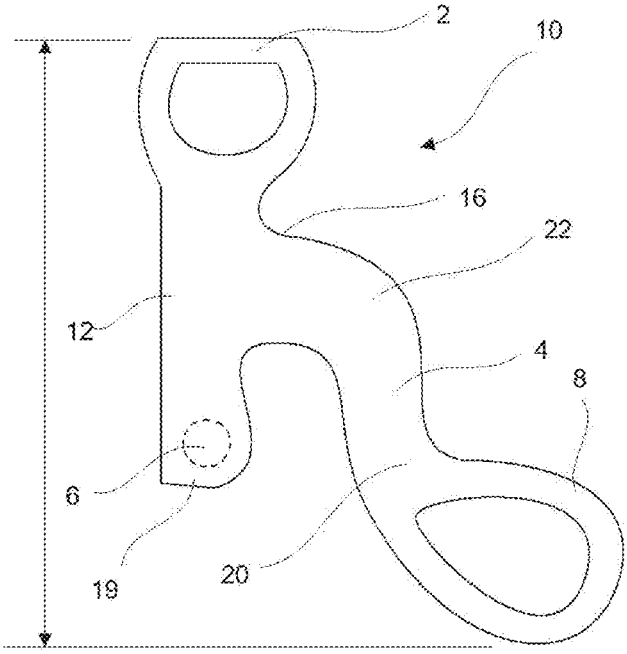
FIG. 3 is a side view of an alternative design of the perch-shank device of the present invention.
Figure 4:
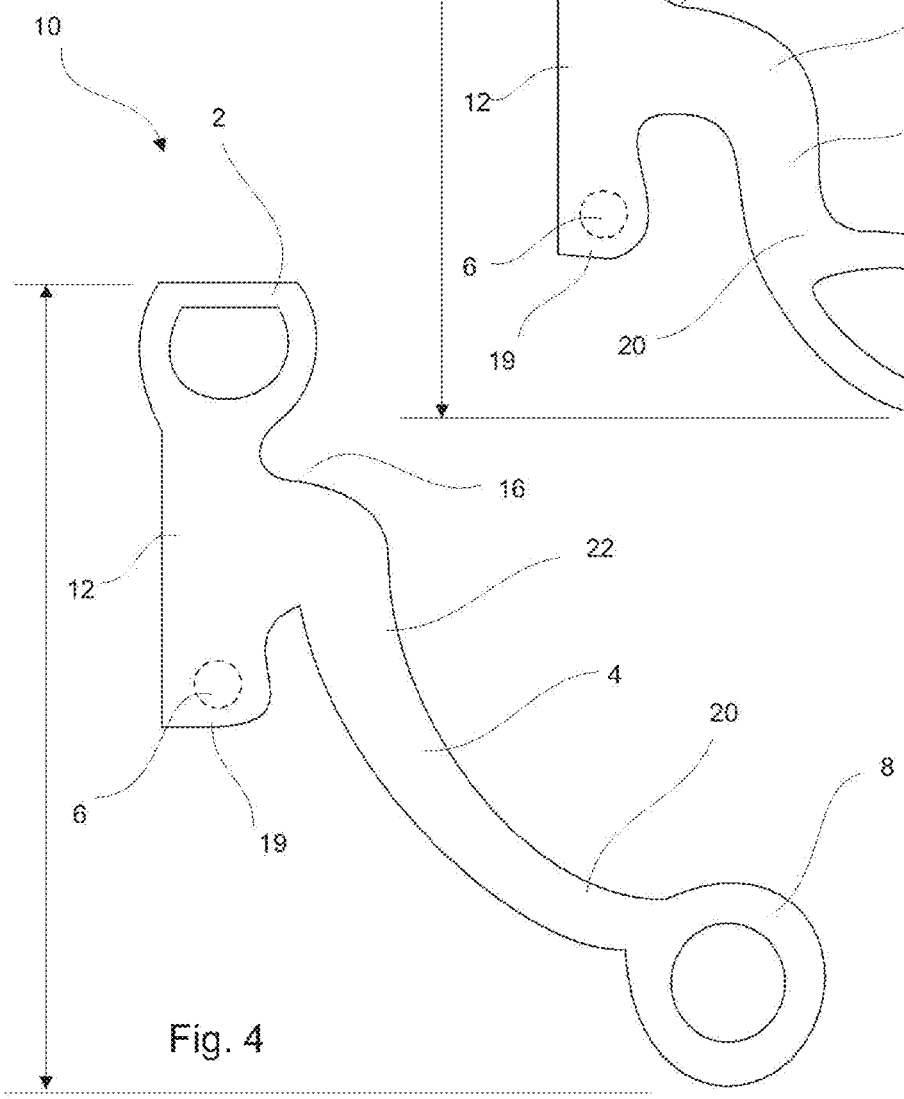
FIG. 4 is a side view of an alternative design of the perch-shank device of the present invention.
Figure 5:
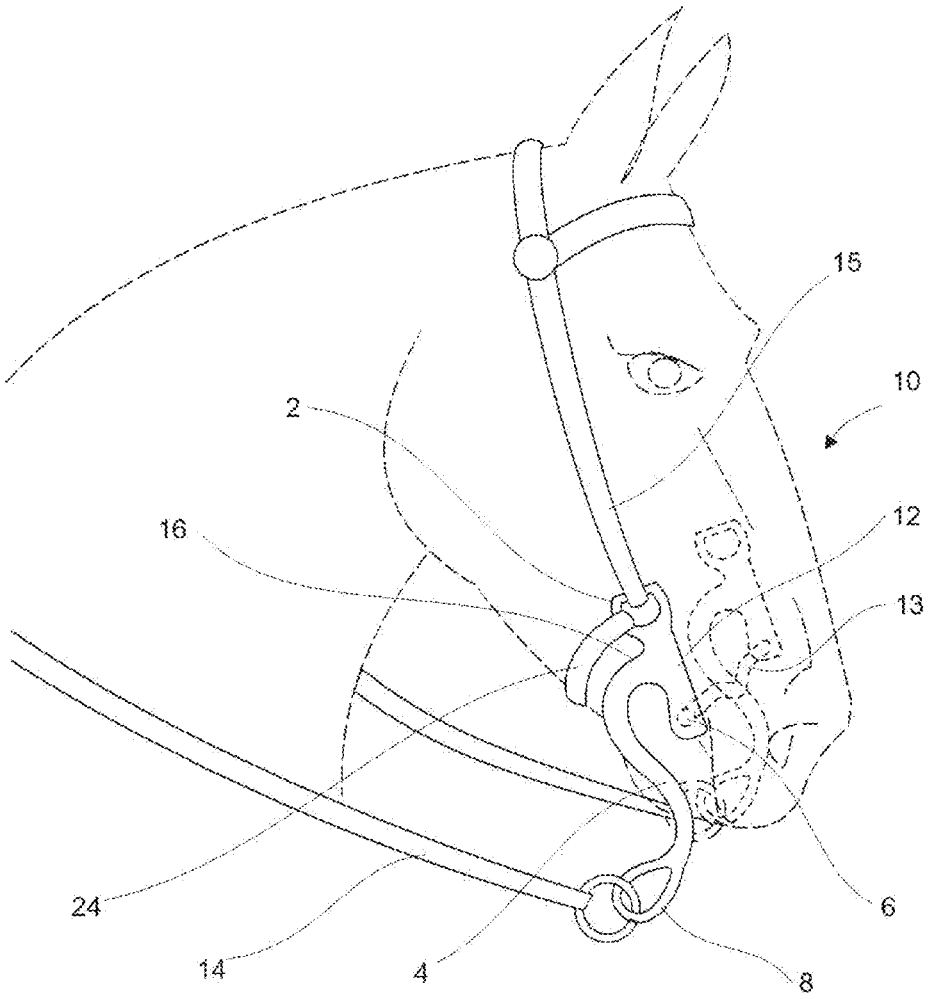
FIG. 5 is a view of the perch-shank device mounted on a horse.

In FIGS. 2-4, the perch-shank device 10 includes a headstall/chinstrap attachment loop 2, a perch 12, a shank 4, a mouthpiece attachment portion 6 *which includes a central axis A*, and a reins attachment loop 8. As best illustrated in FIG. 5, the shank 4, when worn by a horse, from the shank's 4 point of attachment 16 to the perch 12, extends generally perpendicularly outward from the perch 12, toward the horse, then downwardly therefrom. The shank 4 hooks outwardly as the shank 4 extends downwardly, forming an "S" shape, respectively. It is not necessary that the shank 4 be in any one particular shape, as long as it extends downward so that it provides a means for attaching a rein below the mouthpiece 13. The lower portion 20 of the shank 4 extends below the lower portion 19 of the perch 12. However, it is not essential that the lower portion 20 of the shank 4 extends below the lower portion 19 of the perch 12. For example, as illustrated in FIG. 3, the lower portion 20 of the shank 4 is approximately parallel to the lower portion 19 of the perch 12.

Alternatively, the rein attachment loop 8 may exist at a lower portion 20 of the shank 4 prior to termination. It is not essential that the rein 14 be attached to a loop. Alternatively, the shank 4 may have a ring, a hook, or related means for attaching the rein 14. The means for attaching the rein 14 may be an integral part of the shank 4, or may be attached. The means for attaching the rein 14 may be fixed, or moveable, or movably fixable using, for example, a nut, bolt, rivet, or the like. Additionally, the rein attachment loop 8, or other means for attaching the reins 14, may extend backward toward the horse as illustrated in FIG. 5.

The upper portion 11 of the perch 12 terminates with a headstall/chinstrap attachment loop 2. Likewise, it is not essential that the perch 12 terminate with a headstall/chinstrap attachment loop 2. Alternatively, the headstall/chinstrap attachment loop 2 may exist at an upper portion 11 of the perch 12, prior to termination. The perch 12 may have a ring, a hook, or related means for attaching the headstall 15 and chinstrap 24. The means for attaching the headstall 15 and chinstrap 24 may be an integral part of the perch 12, or may be attached. The means for attaching the headstall 15 and chinstrap 24 may be fixed, or moveable, or movably fixable using, for example, a nut, bolt, rivet, or the like. Additionally, the headstall/chinstrap attachment loop 2 may extend backward toward the horse.

From the perch's 12 point of attachment 16 to the shank 4, the perch 12 extends downward so that a lower portion 19 of the perch 12 connects the mouthpiece 13 substantially below the point of attachment 16. The point of attachment 16 of the shank 4 to the perch 12 may occur at the central 17 or upper 11 portions of the perch 12.

As understood from viewing FIG. 5, two perch-shank devices 10 may be connected by a mouthpiece 13. The mouthpiece 13 connects the mouthpiece attachment portions 6, thus holding two perch-shank devices 10 in an essentially fixed and essentially parallel relation, such that when the mouthpiece is in the horse's mouth, a one perch-shank device 10 is on each side of the horse's head.

Figure 1:
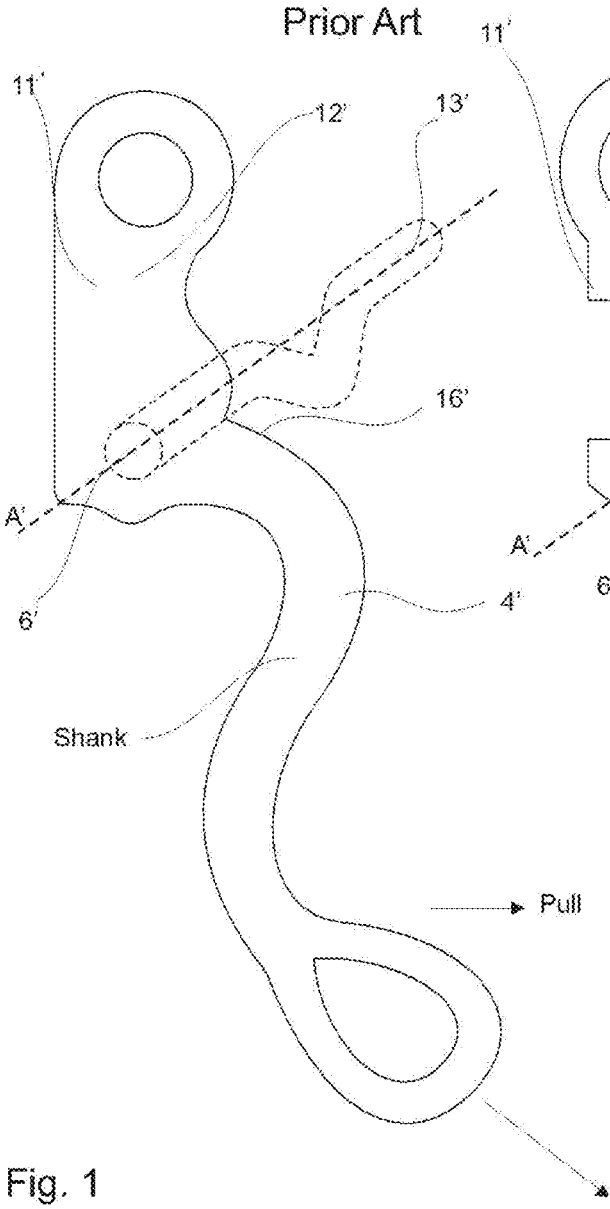
FIG. 1 is a side view of a prior existing perch-shank device *showing in perspective a mouth piece in dotted lines.*
Figure 1A:
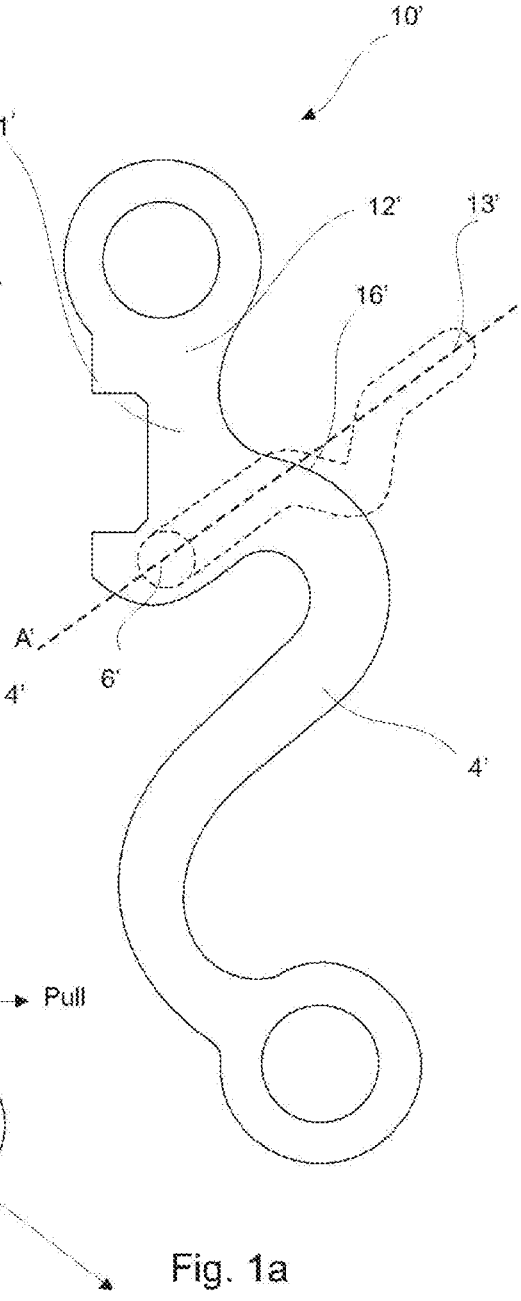
FIG. 1a is a side view of an alternative design of a prior existing perch-shank device *showing in perspective a mouth piece in dotted lines.*

*Upper portion of shank 22 includes an arch having an uppermost end surface 23 and a lowermost end surface 25 wherein the lowermost end surface 25 extends substantially perpendicular above mouth piece portion 6 and central axis A thereof.* The location of the mouthpiece 13 is such that, when the reins 14 are pulled by a rider, the upper portion 22 of the shank 4 pushes the perch 12 and headstall/chinstrap attachment loop 2 forward, such that the headstall 15 and chinstrap 24 connected to the headstall/chinstrap attachment loop 2 act to limit the forward movement of the perch 12 and headstall/chinstrap attachment loop 2, allowing far minimal pulling of the mouthpiece 13 backward, thus forcing the horse's head toward its chest. As mentioned above, and shown in FIGS. 1 and 1a, traditional perch-shank devices 10' locate the mouthpiece 13' in close relation to the point of attachment 16' between the perch 12' and the shank 4', such that when a rider pulls on the mouthpiece attachment portion 6', the mouthpiece 13' is pulled downward in a manner substantially more forceful and with minimal, if any, push force exerted in the upper portion 11' of the perch 12', giving the rider less control over the horse, and giving less form to the horse.

While the present invention has been described in connection with the illustrated embodiments, it will be appreciated and understood that modifications may be made without departing from the true spirit and scope of the invention. The modifications are intended to be encompassed by the claims hereto.

What is claimed is:

1. A perch-shank device, comprising:

a perch having upper, central, and lower portions, said [upper portion] *perch* having a *single* means for attaching at least one of a headstall and a chinstrap, *wherein said single means is disposed on said upper portion,* said lower portion *immovably fixably and* configured for direct attachment to a mouthpiece*, said mouthpiece having a central axis*; and a shank having upper and lower portions, said lower portion of said shank having [a] means for attaching a rein wherein said perch and said shank are *integrally* continuously formed without any fastening means, and said upper portion of said shank *having an arch, said arch includes uppermost end surface and a lowermost end surface wherein said lowermost end surface which extends substantially perpendicular above the mouthpiece and* is fixably connected to said perch substantially above a point of said mouthpiece [attachment to lower portion of said perch] *proximate midway between said mouthpiece and said means for attaching* which when said perch-shank device is worn by a horse *said upper portion of said perch extends lateral to a bridge of the horse's nose and said lower portion of said shank is disposed substantially below said point of said mouthpiece attachment* aid to limit the forward movement of said perch and allow for minimal pulling of the mouthpiece backward and aids in forcing the horse's head toward the horse's chest.

2. The perch-shank device of claim 1, wherein said shank, from said shank's point of connection to said perch, extends generally perpendicularly outward from said perch, then downwardly therefrom.

3. The perch-shank device of claim 2, wherein said shank hooks outwardly as said shank extends downwardly, forming an "S" shape, respectively.

4. The perch-shank device of claim 1, wherein said lower portion of said shank extends below said lower portion of said perch.

5. A perch-shank device, comprising:

a mouthpiece*, said mouthpiece having a central axis*;

two perches, each having upper, central, and lower portions, each said [upper portion] *perch* having a *single* means for attaching at least one of a headstall and a chinstrap *and wherein said single means is disposed on said upper portion*, said lower portions *fixably* configured for direct attachment to [a] opposing ends of said mouthpiece; and two shanks, each having upper and lower portions, each said lower portion having means for attaching a rein wherein each said perch and said shank are *integrally* continuously formed without any fastening means, and wherein each said upper portion of each said shank *having an arch, said arch includes uppermost end surface and a lowermost end surface wherein said lowermost end surface which extends substantially perpendicular above the mouthpiece and* is fixably connected to each said perch substantially above a point of said mouthpiece [attachment to said lower portion of each said perch] *proximate midway between said mouthpiece and said means for attaching* which when said perch-shank device is worn by a horse [aids] *said upper portion of each said perch extends lateral to a bridge of the horse's nose and said lower portion of each said shank is disposed substantially below said point of said mouthpiece attachment to aid* to limit the forward movement of said perches and allow for minimal pulling of the mouthpiece backward and aid in forcing the horse's head toward the horse's chest.

6. The perch-shank device of claim 5, wherein each said perch and each said shank is held essentially fixed and in essentially parallel relation by said mouthpiece, such that when said mouthpiece is positioned in a horse's mouth, said mouthpiece holds one said perch and shank on each side of said horse's head.

7. The perch-shank device of claim 6, wherein each said shank, from said connection to each said perch, extends generally perpendicularly outward, toward said horse, and in downwardly therefrom.

8. The perch-shank device of claim 7, wherein each said shank hooks outwardly as each said shank extends downwardly, forming an "S" shape, respectively.

9. The perch-shank device of claim 5, wherein each said lower portion of each said shank extends below each said lower portion of each said perch.

10. The perch-shank device of claim 5, wherein each said means for attaching said rein is located at each said lower portion of each said shank such that when said rein is pulled by a rider, each said shank pushes each said upper portion of each said perch forward, away from a horse, while pulling said mouthpiece more backward than downward, thus pulling said horse's head toward said horse's chest.

* * * * *